(12) United States Patent
Tang (10) Patent No.: US 11,233,613 B2
(45) Date of Patent: Jan. 25, 2022

(54) PILOT SIGNAL TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/332,708

(22) PCT Filed: Sep. 12, 2016

(86) PCT No.: PCT/CN2016/098712
§ 371 (c)(1),
(2) Date: Mar. 12, 2019

(87) PCT Pub. No.: WO2018/045586
PCT Pub. Date: Mar. 15, 2018

(65) Prior Publication Data
US 2019/0215120 A1 Jul. 11, 2019

(51) Int. Cl.
*H04L 5/00* (2006.01)
*H04L 27/26* (2006.01)
*H04W 72/12* (2009.01)

(52) U.S. Cl.
CPC .......... *H04L 5/0048* (2013.01); *H04L 5/0094* (2013.01); *H04L 27/26* (2013.01); *H04W 72/1289* (2013.01); *H04L 5/0007* (2013.01)

(58) Field of Classification Search
CPC combination set(s) only.
See application file for complete search history.

(56) References Cited

U.S. PATENT DOCUMENTS 8,848,672 B2 9/2014 Ko
2006/0293056 A1* 12/2006 Kim ...................... H04W 36/18
455/442

(Continued)

FOREIGN PATENT DOCUMENTS

CN 101808409 A 8/2010
CN 102209061 A 10/2011
(Continued)

OTHER PUBLICATIONS

International Search Report in international application No. PCT/CN2016/098712, dated Jun. 2, 2017.
(Continued)

*Primary Examiner* — Natasha W Cosme
(74) *Attorney, Agent, or Firm* — Ladas & Parry LLP (57) ABSTRACT

Embodiments of the present invention provide a pilot signal transmission method and a communication device, by which the problem of inflexibility caused by pre-allocated transmission resources can be avoided, and the waste of resources can be avoided. The method comprises: a first device receives a first message sent by a second device, the first message being used for instructing the first device to receive to send a pilot signal, and the first message comprising resource allocation information of the pilot signal; and the first device sends the pilot signal to the second device or receives the pilot signal sent by the second device according to the resource allocation information.

13 Claims, 4 Drawing Sheets

(56) References Cited

U.S. PATENT DOCUMENTS

| | | | |
|---|---|---|---|
| 2011/0261767 | A1 | 10/2011 | Ji et al. |
| 2011/0268087 | A1 | 11/2011 | Kwon |
| 2013/0028138 | A1 | 1/2013 | Hao |
| 2013/0128860 | A1* | 5/2013 | Zhang .................. H04W 72/04 370/330 |
| 2015/0049622 | A1* | 2/2015 | Kim .................. H04W 52/146 370/252 |
| 2015/0230211 | A1 | 8/2015 | You et al. |
| 2016/0087774 | A1* | 3/2016 | Guo .................. H04L 5/0051 370/329 |
| 2016/0219624 | A1 | 7/2016 | Lin et al. |
| 2017/0064613 | A1 | 3/2017 | Harada et al. |
| 2019/0174399 | A1 | 6/2019 | Harada et al. |

FOREIGN PATENT DOCUMENTS

| | | |
|---|---|---|
| CN | 102378379 A | 3/2012 |
| CN | 102413572 A | 4/2012 |
| CN | 102573060 A | 7/2012 |
| CN | 103441830 A | 12/2013 |
| CN | 104038312 A | 9/2014 |
| CN | 104106223 A | 10/2014 |
| CN | 104125186 A | 10/2014 |
| CN | 105830487 A | 8/2016 |
| EP | 2613466 A2 | 7/2013 |
| EP | 3142422 A1 | 3/2017 |
| JP | 2013520091 A | 5/2013 |
| JP | 2016518758 A | 6/2016 |
| KR | 20130037602 A | 4/2013 |
| KR | 20150010625 A | 1/2015 |
| RU | 2553983 C2 | 6/2015 |
| WO | 2015170569 | 11/2015 |

OTHER PUBLICATIONS

Written Opinion of the International Search Authority in international application No. PCT/CN2016/098712, dated Jun. 2, 2017.
Supplementary European Search Report in the European application No. 16915520.7, dated Jul. 4, 2019.
Ericsson: "Key principles for beam management", 3GPP Draft; R1-167466 Key Principles for Beam Management, 3rd Generation Partnership Project (3GPP), Mobile Competence Centre ; 650, Route Des Lucioles ; F-06921 Sophia-Antipolis Cedex ; France, vol. RAN WG1 , No. Göteborg; Aug. 22, 2016-Aug. 26, 2016 Aug. 21, 2016 (Aug. 21, 2016), XP051140689, Retrieved from the Internet: URL:http://www.3gpp.org/ftp/Meetings_3GPP_SYNC/RAN1/Docs/ [retrieved on Aug. 21, 2016] * section 2 *.
English translation of the Written Opinion of the International Search Authority in the international application No. PCT/CN2016/098712, dated Jun. 2, 2017.
Notice of Allowance of Russian application No. 2019110170, dated Dec. 5, 2019.
English Abstract of Russian Patent No. 2553983.
First Office Action of the Chilean application No. 201900615, dated Dec. 26, 2019.
"3rd Generation Partnership Project;Technical Specification Group Radio Access Network;Evolved Universal Terrestrial Radio Access (E-UTRA);Physical layer procedures(Release 13)"; 3GPP TS 36.213 V13.2.0 (Jun. 2016).
Second Office Action of the Chinese application No. 201680089009. 1, dated Jun. 15, 2020.
First Office Action of the Brazilian application No. BR1120190038060, dated Aug. 18, 2020.
Samsung et al., "WF on Aperiodic CSI-RS for Rel.14", 3GPP TSG-RAN WG1 Meeting #86 R1-168046, Gothenburg, Sweden Aug. 22-26, 2016, 6 pages.
Ericsson, "Reference signals and reports to support beam management", 3GPP TSG-RAN WG1 Meeting #86 R1-167467, Göteborg, Sweden, Aug. 22-26, 2016, 2 pages.
Third Office Action of the Chinese application No. 201680089009. 1, dated Sep. 27, 2020.
Office Action of the Indian application No. 201917014095, dated Oct. 5, 2020.
First Office Action of the Israel application No. 265237, dated Nov. 10, 2020.
Second Written Opinion of the Singaporean application No. 11201902115X, dated Dec. 2, 2020.
First Office Action of the Japanese application No. 2019-513809, dated Dec. 4, 2020.
ZTE Corporation et al: "Enhancements on Beamformed CSI-RS", 3GPP Draft; R1-164310, May 14, 2016. XP051096493, Retrieved from the Internet: URL: http://www.3gpp.org/tp/tsg_ran/WG1_RL1/TSGR1_86/Docs/ [retrieved on May 14, 2016].
Second Office Action of the European application No. 16915520.7, dated Jan. 20, 2021.
Notice of Allowance of the Chinese application No. 201680089009. 1, dated Dec. 18, 2020.
Second Office Action of the Canadian application No. 3036518, dated Apr. 23, 2021.
Third Office Action of the Chilean application No. 2019-000615, dated Jun. 22, 2021.
First Office Action of the Indonesia application No. P00201903095, dated Apr. 12, 2021.
First Office Action of the Taiwanese application No. 106128856, dated Jul. 9, 2021.
LG Electronics, InterDigital, Samsung, Huawei, HiSilcon. Qualcomm, CATT, "WF on Rate Matching Issue for Beamformed CSIRS", 3GPP TSG-RAN WG1 Meeting #86 R1-168147, [online], Aug. 28, 2016, slides 1-2, [Search date Jul. 9, 2017], URL, [retrieved on Jul. 9, 2021], <URL: https://www. 3gpp org/ftp/tsg_ran/WG1_RL1/TSGR1_86/Docs/R1-168147.zip>.
Huawei, HiSilicon, "Discussion on efficient utilization of BF CSI-RS", 3GPP TSG-RAN WG1 Meeting #85 R1-164858, May 14, 2016, pp. 1-4, [Search date Jul. 9, 2017], URL, [retrieved on Jul. 9, 2021],<URL: https://www. 3gpp.org/ftp/tsg_ran/WG1_RL1/TSGR1_85/Docs/R1-164858. zip>.
Notice of Allowance of the Japanese application No. 2019-513809, dated Jul. 16, 2021.
First Office Action of the Chinese applicaton No. 201680089009.1, dated Mar. 10, 2020.
First Office Action of the Canadian application No. 3036518, dated Mar. 13, 2020.
Written Opinion of the Singaporean application No. 11201902115X, dated Mar. 28, 2020.
First Office Action of the European application No. 16915520.7, dated May 14, 2020.
Second Office Action of the Chilean application No. 201900615, dated Jun. 1, 2020.
First Office Action of the Australian application No. 2018422767, dated Oct. 11, 2021.

\* cited by examiner

A first device receives a first message sent by a second device, the first message indicating the first device to receive or send a pilot signal and including resource configuration information of the pilot signal — 110

The first device sends the pilot signal to the second device or receives the pilot signal sent by the second device according to the resource configuration information — 120

```
A second device sends a first message to a first device, the
first message indicating the first device to receive or send a
pilot signal and including resource configuration
information of the pilot signal
```
210

```
The second device sends the pilot signal to the first device
or receives the pilot signal sent by the second device
according to the resource configuration information
```
220

```
A first device receives a first message sent by a second
device, the first message indicating the first device to
receive or send a pilot signal
```
310

```
The second device sends the pilot signal to the first device
or receives the pilot signal sent by the first device according
to the resource configuration information
```
320

```
A second device sends a first message to a first device, the
first message indicating the first device to receive or send a
pilot signal
```
410

```
The second device sends the pilot signal to the first device
or receives the pilot signal sent by the first device in a time-
domain RE transmitting the first message
```
420

PILOT SIGNAL TRANSMISSION METHOD AND DEVICE

RELATED APPLICATION

This application is an application under 35 U.S.C. 371 of International Application No. PCT/CN2016/098712 filed on Sep. 12, 2016, the entire contents of which are incorporated herein by reference.

TECHNICAL FIELD

The application relates to the field of communication, and more particularly to a method for transmission of a pilot signal and device.

BACKGROUND

Aperiodic Sounding Reference Signal (SRS) transmission is introduced into a Long Term Evolution (LTE) system and a base station may trigger SRS transmission of a terminal device through Downlink Control Information (DCI). The terminal device, after receiving SRS triggering signaling, performs SRS transmission on a closest resource in preconfigured resources for aperiodic SRS transmission. The resources for aperiodic SRS transmission are preconfigured for the terminal through high-layer signaling. Such a configuration manner is relatively poor in flexibility and may not be flexibly regulated.

SUMMARY

Embodiments of the application provide a method for transmission of a pilot signal and device, which may solve the problem of inflexibility caused by pre-configuration of a transmission resource and may also avoid resource waste.

A first aspect provides a method for transmission of a pilot signal, which may include the following operations.

A first device receives a first message sent by a second device, the first message indicating the first device to receive or send a pilot signal and the first message including resource configuration information of the pilot signal.

The first device sends the pilot signal to the second device or receives the pilot signal sent by the second device according to the resource configuration information.

In such a manner, in the embodiments of the application, the first device contains the resource configuration information of the pilot signal in the first message triggering the second device to receive or send the pilot signal and the resource configuration information of the pilot signal may be notified to the second device only when the pilot signal is required to be transmitted. Therefore, resource configuration may be implemented according to a requirement, the problem of inflexibility caused by pre-configuration of a transmission resource may be solved and resource waste may also be avoided.

In combination with the first aspect, in a first possible implementation mode of the first aspect, the operation that the first device sends the pilot signal to the second device or receives the pilot signal sent by the second device may include the following operation.

The first device sends the pilot signal to the second device or receives the pilot signal sent by the second device in a time-domain resource unit transmitting the first message.

In combination with the first aspect or any abovementioned possible implementation mode thereof, in a second possible implementation mode of the first aspect, the resource configuration information may include at least one of time-domain resource configuration information, frequency-domain resource configuration information or sequence configuration information of the pilot signal.

In combination with the first aspect or any abovementioned possible implementation mode thereof, in a third possible implementation mode of the first aspect, the time-domain resource configuration information may be configured to indicate at least one of timing information of the pilot signal or time-domain physical resource information adopted for transmission of the pilot signal.

In combination with the first aspect or any abovementioned possible implementation mode thereof, in a fourth possible implementation mode of the first aspect, the timing information may be configured to indicate a time-domain location of the pilot signal relative to the first message or a time-domain location of the pilot signal relative to data transmission scheduled by the first message.

In combination with the first aspect or any abovementioned possible implementation mode thereof, in a fifth possible implementation mode of the first aspect, the time-domain physical resource information may be configured to indicate at least one of an index of each of time-domain resource units adopted for transmission of the pilot signal in a predetermined time or a total number of the time-domain resource units.

In combination with the first aspect or any abovementioned possible implementation mode thereof, in a sixth possible implementation mode of the first aspect, the frequency-domain resource configuration information may be configured to indicate at least one of a transmission bandwidth of the pilot signal, a transmission density of the pilot signal, a frequency-domain starting location for transmission of the pilot signal or a subcarrier spacing adopted for transmission of the pilot signal.

In combination with the first aspect or any abovementioned possible implementation mode thereof, in a seventh possible implementation mode of the first aspect, the sequence configuration information may be configured to indicate at least one of information about a scrambling sequence used in generating the pilot signal or information about a root sequence used in generating the pilot signal.

In combination with the first aspect or any abovementioned possible implementation mode thereof, in an eighth possible implementation mode of the first aspect, the first message may further be configured to schedule data transmitted between the first device and the second device.

In combination with the first aspect or any abovementioned possible implementation mode thereof, in a ninth possible implementation mode of the first aspect, the first message may be DCI signaling.

In combination with the first aspect or any abovementioned possible implementation mode thereof, in a tenth possible implementation mode of the first aspect, the pilot signal may be an SRS, a Channel State Information Reference Signal (CSI-RS), a Demodulation Reference Signal (DMRS), a Cell-specific Reference Signal (CRS) or a Beam Management Reference Signal (BMRS).

A second aspect provides a method for transmission of a pilot signal, which may include the following operations.

A second device sends a first message to a first device, the first message indicating the first device to receive or send a pilot signal and including resource configuration information of the pilot signal.

The second device sends the pilot signal to the first device or receives the pilot signal sent by the first device according to the resource configuration information.

In combination with the second aspect, in a first possible implementation mode of the second aspect, the operation that the second device sends the pilot signal to the first device or receives the pilot signal sent by the first device may include the following operation.

The second device sends the pilot signal to the first device or receives the pilot signal sent by the first device in a time-domain resource unit transmitting the first message.

In combination with the second aspect or any abovementioned possible implementation mode thereof, in a second possible implementation mode of the second aspect, the resource configuration information may include at least one of time-domain resource configuration information, frequency-domain resource configuration information or sequence configuration information of the pilot signal.

In combination with the second aspect or any abovementioned possible implementation mode thereof, in a third possible implementation mode of the second aspect, the time-domain resource configuration information may be configured to indicate at least one of timing information of the pilot signal or time-domain physical resource information adopted for transmission of the pilot signal.

In combination with the second aspect or any abovementioned possible implementation mode thereof, in a fourth possible implementation mode of the second aspect, the timing information may be configured to indicate a time-domain location of the pilot signal relative to the first message or a time-domain location of the pilot signal relative to data transmission scheduled by the first message.

In combination with the second aspect or any abovementioned possible implementation mode thereof, in a fifth possible implementation mode of the second aspect, the time-domain physical resource information may be configured to indicate an index of each of time-domain resource units adopted for transmission of the pilot signal in a predetermined time or a total number of the time-domain resource units.

In combination with the second aspect or any abovementioned possible implementation mode thereof, in a sixth possible implementation mode of the second aspect, the frequency-domain resource configuration information may be configured to indicate at least one of a transmission bandwidth of the pilot signal, a transmission density of the pilot signal, a frequency-domain starting location for transmission of the pilot signal or a subcarrier spacing adopted for transmission of the pilot signal.

In combination with the second aspect or any abovementioned possible implementation mode thereof, in a seventh possible implementation mode of the second aspect, the sequence configuration information may be configured to indicate at least one of information about a scrambling sequence used in generating the pilot signal or information about a root sequence used in generating the pilot signal.

In combination with the second aspect or any abovementioned possible implementation mode thereof, in an eighth possible implementation mode of the second aspect, the first message may further be configured to schedule data transmitted between the first device and the second device.

In combination with the second aspect or any abovementioned possible implementation mode thereof, in a ninth possible implementation mode of the second aspect, the first message may be DCI signaling.

In combination with the second aspect or any abovementioned possible implementation mode thereof, in a tenth possible implementation mode of the second aspect, the pilot signal may be an SRS, a CSI-RS, a DMRS, a CRS or a BMRS.

A third aspect provides a method for transmission of a pilot signal, which includes the following operations.

A first device receives a first message sent by a second device, the first message indicating the first device to receive or send a pilot signal.

The first device sends the pilot signal to the second device or receives the pilot signal sent by the second device in a time-domain resource unit transmitting the first message.

In such a manner, in the embodiments of the application, the first message and the pilot signal are transmitted in the same time-domain resource unit, so that pilot signal flexibility may further be improved and a pilot signal transmission delay may be reduced.

In combination with the third aspect, in a first possible implementation mode of the third aspect, the time-domain resource unit is a radio frame, a subframe, a time slot or a short time slot.

In combination with the third aspect or any abovementioned possible implementation mode thereof, in a second possible implementation mode of the third aspect, the pilot signal is an SRS, a CSI-RS, a DMRS, a CRS or a BMRS.

A fourth aspect provides a method for transmission of a pilot signal, which includes the following operations.

A second device sends a first message to a first device, the first message indicating the first device to receive or send a pilot signal.

The second device sends the pilot signal to the first device or receives the pilot signal sent by the first device in a time-domain resource unit transmitting the first message.

In combination with the fourth aspect, in a first possible implementation mode of the fourth aspect, the time-domain resource unit is a radio frame, a subframe, a time slot or a short time slot.

In combination with the fourth aspect or any abovementioned possible implementation mode thereof, in a second possible implementation mode of the fourth aspect, the pilot signal is an SRS, a CSI-RS, a DMRS, a CRS or a BMRS.

A fifth aspect provides a communication device, which is configured to execute the method in the first aspect or any optional implementation mode of the first aspect. Specifically, the communication device includes units configured to execute the method in the first aspect or any possible implementation mode of the first aspect.

A sixth aspect provides a communication device, which is configured to execute the method in the second aspect or any optional implementation mode of the second aspect. Specifically, the communication device includes units configured to execute the method in the second aspect or any possible implementation mode of the second aspect.

A seventh aspect provides a communication device, which is configured to execute the method in the third aspect or any optional implementation mode of the third aspect. Specifically, the communication device includes units configured to execute the method in the third aspect or any possible implementation mode of the third aspect.

An eighth aspect provides a communication device, which is configured to execute the method in the fourth aspect or any optional implementation mode of the fourth aspect. Specifically, the communication device includes units configured to execute the method in the fourth aspect or any possible implementation mode of the fourth aspect.

A ninth aspect provides a communication device, which includes a memory and a processor. The memory is configured to store an instruction. The processor is configured to execute the instruction stored in the memory. When the processor executes the instruction stored in the memory, such execution enables the processor to execute the method in the first aspect or any optional implementation mode of the first aspect.

A tenth aspect provides a communication device, which includes a memory and a processor. The memory is configured to store an instruction. The processor is configured to execute the instruction stored in the memory. When the processor executes the instruction stored in the memory, such execution enables the processor to execute the method in the second aspect or any optional implementation mode of the second aspect.

An eleventh aspect provides a communication device, which includes a memory and a processor. The memory is configured to store an instruction. The processor is configured to execute the instruction stored in the memory. When the processor executes the instruction stored in the memory, such execution enables the processor to execute the method in the third aspect or any optional implementation mode of the third aspect.

A twelfth aspect provides a communication device, which includes a memory and a processor. The memory is configured to store an instruction. The processor is configured to execute the instruction stored in the memory. When the processor executes the instruction stored in the memory, such execution enables the processor to execute the method in the fourth aspect or any optional implementation mode of the fourth aspect.

A thirteenth aspect provides a computer storage medium, in which a program code is stored, the program code indicating the method in the first aspect or any optional implementation mode of the first aspect to be executed.

A fourteenth aspect provides a computer storage medium, in which a program code is stored, the program code indicating the method in the second aspect or any optional implementation mode of the second aspect to be executed.

A fifteenth aspect provides a computer storage medium, in which a program code is stored, the program code indicating the method in the first aspect or any optional implementation mode of the first aspect to be executed.

A sixteenth aspect provides a computer storage medium, in which a program code is stored, the program code indicating the method in the second aspect or any optional implementation mode of the second aspect to be executed.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

It is to be understood that the technical solutions of the embodiments of the application may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a New Radio (NR) scenario and a future 5th-Generation (5G) system.

In the embodiments of the application, a terminal device may also refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the application, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like.

Figure 1:
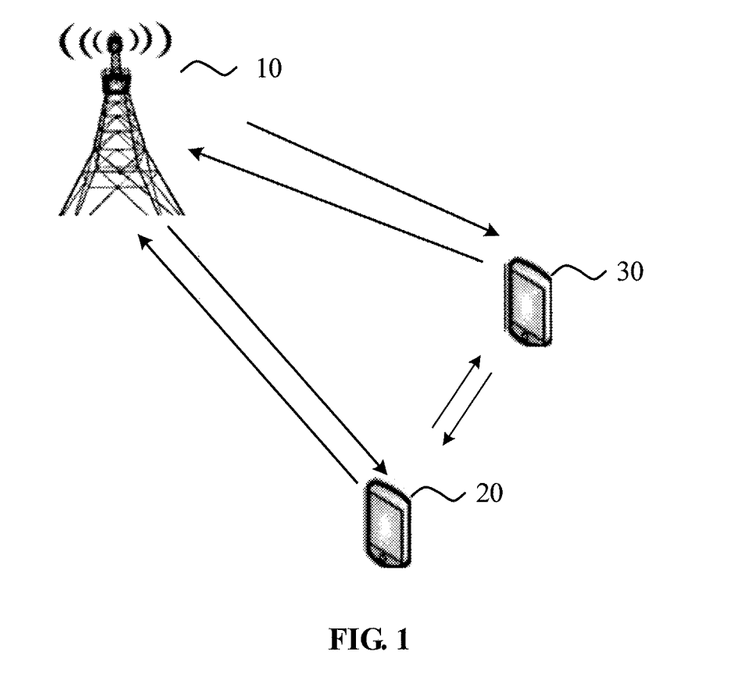
FIG. 1 illustrates a diagram of an application scenario according to an embodiment of the application.

FIG. 1 is a schematic diagram of an application scenario according to the application. A communication system in FIG. 1 may include a network device 10, a terminal device

20 and a terminal device 30. The network device 10 is configured to provide communication service for the terminal device 20 for access to a core network. The terminal device 20 searches a synchronization signal, broadcast signal and the like sent by the network device 10 to access the network, thereby communicating with the network.

Optionally, the terminal device 20 may also communicate with the terminal device 30.

A method for transmission of a pilot signal of the embodiments of the application may be applied to communication between a network device and a terminal device, and may also be applied to communication between a terminal device and a terminal device, which may be called Device to Device (D2D) communication.

Figure 2:
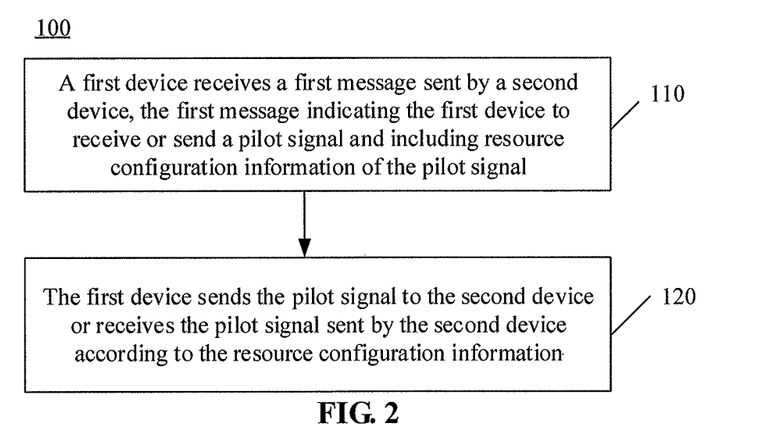
FIG. 2 illustrates a schematic flowchart of a method for transmission of a pilot signal according to an embodiment of the application.

FIG. 2 illustrates a schematic flowchart of a method for transmission of a pilot signal 100 according to an embodiment of the application. It is to be understood that FIG. 2 shows steps or operations of the method for transmission of a pilot signal. However, these steps or operations are only examples. Other operations or transformations of each operation in FIG. 2 may also be executed in the embodiment of the application.

Optionally, a first device may be a terminal device and a second device may be a network device. Or, the first device may be a terminal device and the second device may be a terminal device.

As illustrated in FIG. 2, the method 100 includes 110 and 120.

In 110, a first device receives a first message sent by a second device, the first message indicating the first device to receive or send a pilot signal and including resource configuration information of the pilot signal.

In 120, the first device sends the pilot signal to the second device or receives the pilot signal sent by the second device according to the resource configuration information.

Figure 3:
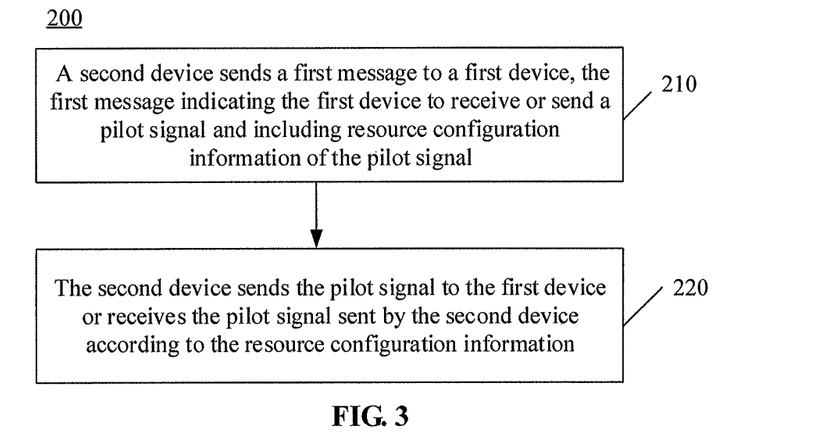
FIG. 3 illustrates a schematic flowchart of a method for transmission of a pilot signal according to an embodiment of the application.

FIG. 3 illustrates a schematic flowchart of a method for transmission of a pilot signal 200 according to an embodiment of the application. It is to be understood that FIG. 3 shows steps or operations of the method for transmission of a pilot signal. However, these steps or operations are only examples. Other operations or transformations of each operation in FIG. 3 may also be executed in the embodiment of the application.

Optionally, the first device may be a terminal device and the second device may be a network device. Or, the first device may be a terminal device and the second device may be a terminal device.

As illustrated in FIG. 3, the method 200 includes 210 and 220.

In 210, a second device sends a first message to a first device, the first message indicating the first device to receive or send a pilot signal and including resource configuration information of the pilot signal.

In 220, the second device sends the pilot signal to the first device or receives the pilot signal sent by the first device according to the resource configuration information.

In such a manner, in the embodiment of the application, the first device contains the resource configuration information of the pilot signal in the first message triggering the second device to receive or send the pilot signal and the resource configuration information of the pilot signal may be notified to the second device only when the pilot signal is required to be transmitted. Therefore, resource configuration may be implemented according to a requirement, the problem of inflexibility caused by pre-configuration of a transmission resource may be solved and resource waste may also be avoided.

Optionally, the pilot signal of the embodiment of the application may be any one of an SRS, a CSI-RS, a DMRS, a CRS and a BMRS.

Optionally, in the embodiment of the application, the resource configuration information of the pilot signal may also be called a transmission parameter of the pilot signal and any configuration information capable of implementing transmission of the pilot signal may be called resource configuration information of the pilot signal.

Optionally, in the embodiment of the application, the resource configuration information of the pilot signal may include at least one of time-domain resource configuration information, frequency-domain resource configuration information and sequence configuration information.

Optionally, in the embodiment of the application, the time-domain resource configuration information indicates timing information of the pilot signal and/or time-domain physical resource information for transmission of the pilot signal.

Optionally, in the embodiment of the application, the timing information of the pilot signal may be configured to indicate a time-domain location of the pilot signal relative to the first message.

Specifically, the timing information of the pilot signal may indicate the number of time-domain resource units between a time-domain resource unit transmitting the pilot signal and a time-domain resource unit transmitting the first message.

Optionally, the time-domain resource unit may be a frame, a subframe, a time slot, a short time slot or an Orthogonal Frequency Division Multiplexing (OFDM) symbol and, of course, may also be another time-domain resource unit, for example, a time-domain resource unit newly defined to meet a communication requirement.

Optionally, a time length of the time-domain resource unit mentioned in the embodiment of the application may form, but not limited to, the following relationship: each frame may be 10 ms long, each frame includes 10 subframes, each subframe includes 2 time slots and each time slot may include 6 or 7 OFDM symbols.

Optionally, under the condition of a normal Cyclic Prefix (CP), the time slot mentioned in the embodiment of the application may include 7 OFDM symbols and the short time slot may include fewer than 7 OFDM symbols. The short time slot mentioned in the embodiment of the application may also be called a mini time slot.

Optionally, in the embodiment of the application, the first message is further configured to schedule data. The timing information of the pilot signal may indicate a time-domain location of the pilot signal relative to the data scheduled by the first message.

Specifically, the timing information of the pilot signal may indicate the number of time-domain resource units between a time-domain resource unit transmitting the pilot signal and a time-domain resource unit transmitting the first message.

Similarly, the time-domain resource unit may be a frame, a subframe, a time slot and an OFDM symbol and, of course, may also be another time-domain resource unit, for example, a time-domain resource unit newly defined to meet a communication requirement.

Optionally, in the embodiment of the application, the time-domain physical resource information may indicate an index of each of time-domain resource units adopted for transmission of the pilot signal in a predetermined time or a total number of the time-domain resource units.

For example, an index of a subframe adopted for transmission of the pilot signal in a single pilot transmission cycle may be indicated and the number of OFDM symbols adopted for transmission of the pilot signal in a single time slot may be indicated.

Optionally, the predetermined time may be at least one subframe, or at least one time slot, or at least one radio frame or at least one pilot signal transmission cycle.

It is to be understood that "indicate" mentioned in the embodiment of the application may refer to direct indication. For example, the number of the OFDM symbols adopted for transmission of the pilot signal in the single time slot is directly contained.

"Indicate" mentioned in the embodiment of the application may also refer to indirect indication (which may also be called implicit indication). For example, if the number of time-domain resource units occupied by one-time pilot signal transmission is fixed or preset, the number of the time-domain resource units adopted for transmission of the pilot signal in the predetermined time may be represented by the number of pilot signal transmissions in the predetermined time. That is, the number of the time-domain resource units adopted for transmission of the pilot signal in the predetermined time may be replaced with pilot signal transmission number information. For example, if each pilot signal transmission occupies an OFDM symbol and the pilot signal is transmitted twice in a subframe, the number of OFDM symbols adopted for the pilot signal in the subframe is two. In such case, a base station may directly indicate the number of the OFDM symbols adopted for the pilot signal in the subframe and may also indicate the number of pilot signal transmissions in the subframe.

Optionally, in the embodiment of the application, the first message may indicate the timing information of the pilot signal and time-frequency physical resource information of the pilot signal.

For example, the timing information of the pilot signal indicates the number of subframes between a subframe transmitting the pilot signal and a subframe transmitting the first message and the time-domain physical resource information indicates a time slot index and/or the number of time slots adopted for transmission of the pilot signal in a single subframe. Therefore, the first device, after receiving the first message, determines a required time-domain resource according to the number of subframes between the subframe transmitting the pilot signal and the subframe transmitting the first signal and the time slot index and/or the number of the time slots adopted for transmission of the pilot signal in the single subframe.

Optionally, in the embodiment of the application, the time-domain resource configuration information in the first message may indicate the timing information of the pilot signal but does not indicate the time-domain physical resource information.

For example, the timing information of the pilot signal indicates the number of subframes between the subframe transmitting the pilot signal and the subframe transmitting the first message. The first device may determine the subframe transmitting the pilot signal according to the timing information. The specific time slot in the subframe and the specific OFDM symbols in the time slot may be preconfigured and may also be randomly selected.

Optionally, in the embodiment of the application, the time-domain resource configuration information in the first message may indicate the time-domain physical resource information but does not indicate the timing information.

For example, the pilot signal may be configured to indicate a subframe number adopted for transmission of the pilot signal in a single pilot cycle and a specific time-domain resource in the subframe. The pilot transmission cycle may be preconfigured for the first device through high-layer signaling.

Optionally, in the embodiment of the application, the frequency-domain resource configuration information in the first message may be configured to indicate at least one of a transmission bandwidth of the pilot signal, a frequency-domain starting location adopted for transmission of the pilot signal, a frequency-domain transmission density of the pilot signal and a subcarrier spacing adopted for transmission of the pilot signal.

Optionally, when the frequency-domain resource configuration information indicates part of information in the transmission bandwidth of the pilot signal, the frequency-domain starting location adopted for transmission of the pilot signal, the frequency-domain transmission density of the pilot signal and the subcarrier spacing adopted for transmission of the pilot signal, the other information may be randomly selected or preconfigured.

Optionally, the frequency-domain transmission density, mentioned in the embodiment of the application, of the pilot signal may be a comb value of the pilot signal. The comb value may refer to a resource unit interval between adjacent pilot resource units on a frequency domain. For example, the comb value may be 1, 2 or 4.

Optionally, the subcarrier spacing of the pilot signal may be 15 KHZ, 30 KHZ, 60 KHZ or 120 KHZ.

Optionally, in the embodiment of the application, the sequence configuration information of the pilot signal may be configured to indicate information about a scrambling sequence configured to generate the pilot signal and/or information about a root sequence configured to generate a pilot sequence.

Optionally, the information about the scrambling sequence configured to generate the pilot signal may be the scrambling sequence and may also be an Identifier (ID) of the scrambling sequence.

Optionally, the information about the root sequence configured to generate the pilot sequence may be the root sequence, may also be information about the root sequence and, for example, may be an initial ID of a pseudo random sequence adopted for generation of the pilot sequence.

Optionally, in the embodiment of the application, the first message may also be configured to schedule the data. Optionally, the first message may be DCI signaling.

Optionally, in the embodiment of the application, the first message may contain indication information indicating the first device whether to transmit the pilot signal or not. The indication information may occupy a preset bit. For example, the indication information may occupy a bit. When the information contained in the bit is 1, it may be determined that the pilot signal is required to be transmitted. When the information contained in the bit is 0, it may be determined that the pilot signal is not required to be transmitted.

Optionally, in the embodiment of the application, the first device may send or receive the pilot signal in the time-domain resource unit transmitting the first message.

Optionally, the first message may directly contain indication information configured to indicate the first device to send or receive the pilot signal in the time-domain resource unit transmitting the first message.

For example, the first message may indicate the pilot signal whether to be sent or received in the time-domain resource unit transmitting the first message or not through a bit.

Optionally, the first message may also contain indication information indirectly indicating the first device to send or receive the pilot signal in the time-domain resource unit transmitting the first message.

For example, the time-domain resource configuration information of the first message indicates the number of OFDM symbols between OFDM symbols transmitting the pilot signal and transmitting the first message. If the number of the OFDM symbols is relatively small, the first message and the pilot signal may be transmitted in the same time slot, the same subframe or the same frame.

Optionally, the first device may also be indicated through another message except the first message to send or receive the pilot signal in the time-domain resource unit transmitting the first message. For example, the first device may be preconfigured through high-layer signaling to send or receive the pilot signal in the time-domain resource unit transmitting the first message.

For example, the first message may contain an index of a time slot. Since it is preconfigured that the first message and the pilot signal are required to be transmitted in the same time-domain resource unit (for example, subframe), in such case, a resource required to transmit the pilot signal may be determined according to the subframe transmitting the first message and the index of the time slot in the first message.

Optionally, the time-domain resource unit may be a frame, a subframe, a time slot and a short time slot and, of course, may also be another time-domain resource unit, for example, a time-domain resource unit newly defined to meet a communication requirement.

For example, the first message is transmitted in a first subframe in a certain frame and the pilot signal may be transmitted in a second subframe in the frame.

For example, the first message is transmitted in a first time slot in a certain subframe and the pilot signal may be transmitted in a second time slot in the subframe.

For another example, the first message is transmitted on first two OFDM symbols in a certain time slot and the pilot signal may be transmitted on last two OFDM symbols in the time slot.

Optionally, when the first device is a terminal device and the second device is a network device, the network device may send the first message in a certain time-domain resource unit, the first message indicating the terminal device to send the pilot signal, and then the terminal device may send the pilot signal in the time-domain resource unit. This means that, in the same time-domain resource unit, downlink transmission may be performed and uplink transmission may also be performed.

In such a manner, in the embodiment of the application, the first message and the pilot signal are transmitted in the same time-domain resource unit, so that pilot signal flexibility may further be improved and a pilot signal transmission delay may be reduced.

Figure 4:
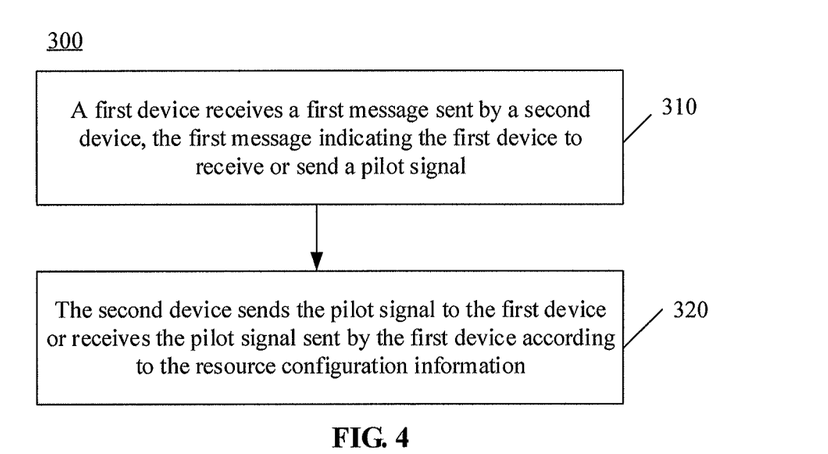
FIG. 4 illustrates a schematic flowchart of a method for transmission of a pilot signal according to an embodiment of the application.

FIG. 4 illustrates a schematic flowchart of a method for transmission of a pilot signal 300 according to an embodiment of the application. It is to be understood that FIG. 4 shows steps or operations of the method for transmission of a pilot signal. However, these steps or operations are only examples. Other operations or transformations of each operation in FIG. 4 may also be executed in the embodiment of the application.

Optionally, a first device may be a terminal device and a second device may be a network device. Or, the first device may be a terminal device and the second device may be a terminal device.

As illustrated in FIG. 4, the method 300 includes 310 and 320.

In 310, the first device receives a first message sent by the second device, the first message indicating the first device to receive or send a pilot signal.

In 320, the first device sends the pilot signal to the second device or receives the pilot signal sent by the second device in a time-domain resource unit transmitting the first message.

Figure 5:
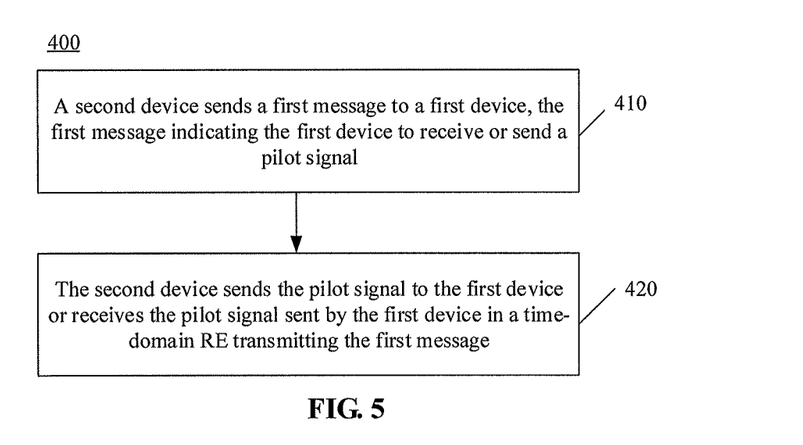
FIG. 5 illustrates a schematic flowchart of a method for transmission of a pilot signal according to an embodiment of the application.

FIG. 5 illustrates a schematic flowchart of a method for transmission of a pilot signal 500 according to an embodiment of the application. It is to be understood that FIG. 5 shows steps or operations of the method for transmission of a pilot signal. However, these steps or operations are only examples. Other operations or transformations of each operation in FIG. 5 may also be executed in the embodiment of the application.

Optionally, a first device may be a terminal device and a second device may be a network device. Or, the first device may be a terminal device and the second device may be a terminal device.

As illustrated in FIG. 5, the method 400 includes 410 and 420.

In 410, the second device sends a first message to the first device, the first message indicating the first device to receive or send a pilot signal.

In 420, the second device sends the pilot signal to the first device or receives the pilot signal sent by the first device in a time-domain resource unit transmitting the first message.

Optionally, the time-domain resource unit may be a frame, a subframe, a time slot and a short time slot and, of course, may also be another time-domain resource unit, for example, a time-domain resource unit newly defined to meet a communication requirement.

For example, the first message is transmitted in a first subframe in a certain frame and the pilot signal may be transmitted in a second subframe in the frame.

For example, the first message is transmitted in a first time slot in a certain subframe and the pilot signal may be transmitted in a second time slot in the subframe.

For another example, the first message is transmitted on first N OFDM symbols in a certain time slot and the pilot signal may be transmitted on last N OFDM symbols in the time slot.

Optionally, specific time-domain resources, adopted for transmission of the pilot signal, in the time-domain resource unit may be preconfigured and randomly selected and may also be contained in the first message for notification to the first device.

In such a manner, in the embodiment of the application, the first message and the pilot signal are transmitted in the same time-domain resource unit, so that pilot signal flexibility may further be improved and a pilot signal transmission delay may be reduced.

Figure 6:
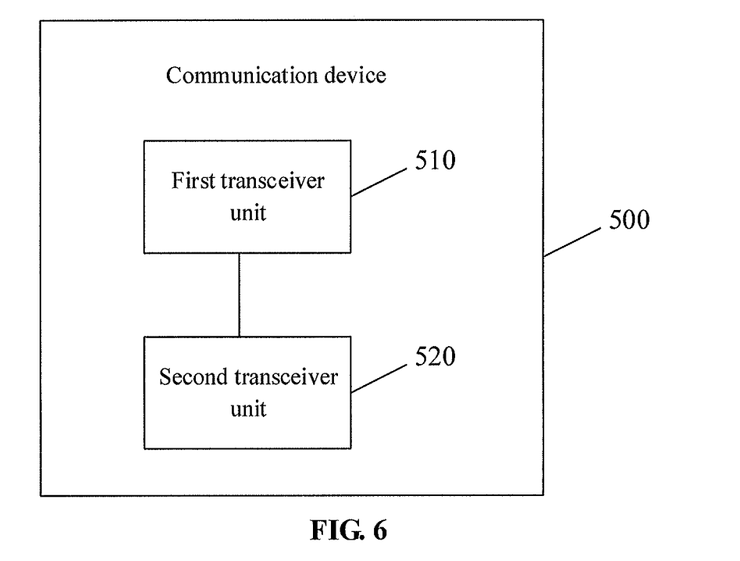
FIG. 6 illustrates a schematic block diagram of a communication device according to an embodiment of the application.

FIG. 6 illustrates a schematic block diagram of a communication device 500 according to an embodiment of the application. As illustrated in FIG. 6, the communication device 500 may include a first transceiver unit 510 and a second transceiver unit 520.

The first transceiver unit 510 is configured to receive a first message sent by a second device, the first message indicating the communication device to receive or send a pilot signal and the first message including resource configuration information of the pilot signal.

The second transceiver unit 520 is configured to send the pilot signal to the second device or receive the pilot signal sent by the second device according to the resource configuration information.

Optionally, the second transceiver unit 520 is specifically configured to send the pilot signal to the second device or receive the pilot signal sent by the second device in a time-domain resource unit transmitting the first message.

Optionally, the resource configuration information includes at least one of time-domain resource configuration information, frequency-domain resource configuration information or sequence configuration information of the pilot signal.

Optionally, the time-domain resource configuration information indicates at least one of timing information of the pilot signal or time-domain physical resource information adopted for transmission of the pilot signal.

Optionally, the timing information indicates a time-domain location of the pilot signal relative to the first message or a time-domain location of the pilot signal relative to data transmission scheduled by the first message.

Optionally, the time-domain physical resource information indicates at least one of an index of each of time-domain resource units adopted for transmission of the pilot signal in a predetermined time or a total number of the time-domain resource units.

Optionally, the frequency-domain resource configuration information indicates at least one of a transmission bandwidth of the pilot signal, a transmission density of the pilot signal, a frequency-domain starting location for transmission of the pilot signal or a subcarrier spacing adopted for transmission of the pilot signal.

Optionally, the sequence configuration information indicates at least one of information about a scrambling sequence used in generating the pilot signal or information about a root sequence used in generating the pilot signal.

Optionally, the first message is further configured to schedule data transmitted between the communication device 500 and the second device.

Optionally, the first message is DCI signaling.

Optionally, the pilot signal is an SRS, a CSI-RS, a DMRS, a CRS or a BMRS.

Optionally, the communication device 500 may correspond to the first device in the method embodiment, may realize corresponding functions of the first device and will not be elaborated herein for simplicity.

Figure 7:
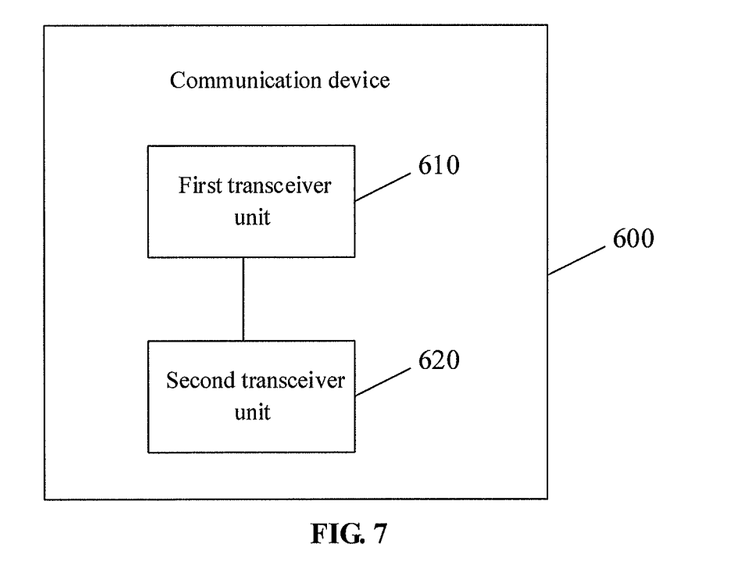
FIG. 7 illustrates a schematic block diagram of a communication device according to an embodiment of the application.

FIG. 7 illustrates a schematic block diagram of a communication device 600 according to an embodiment of the application. As illustrated in FIG. 7, the communication device 600 may include a first transceiver unit 610 and a second transceiver unit 620.

The first transceiver unit 610 is configured to send a first message to a first device, the first message indicating the first device to receive or send a pilot signal and including resource configuration information of the pilot signal.

The second transceiver unit 620 is configured to send the pilot signal to the first device or receive the pilot signal sent by the first device according to the resource configuration information.

Optionally, the second transceiver unit 620 is specifically configured to send the pilot signal to the first device or receive the pilot signal sent by the first device in a time-domain resource unit transmitting the first message.

Optionally, the resource configuration information includes at least one of time-domain resource configuration information, frequency-domain resource configuration information or sequence configuration information of the pilot signal.

Optionally, the time-domain resource configuration information indicates at least one of timing information of the pilot signal or time-domain physical resource information adopted for transmission of the pilot signal.

Optionally, the timing information indicates a time-domain location of the pilot signal relative to the first message or a time-domain location of the pilot signal relative to data transmission scheduled by the first message.

Optionally, the time-domain physical resource information indicates an index of each of time-domain resource units adopted for transmission of the pilot signal in a predetermined time or a total number of the time-domain resource units.

Optionally, the frequency-domain resource configuration information indicates at least one of a transmission bandwidth of the pilot signal, a transmission density of the pilot signal, a frequency-domain starting location for transmission of the pilot signal or a subcarrier spacing adopted for transmission of the pilot signal.

Optionally, the sequence configuration information indicates at least one of information about a scrambling sequence used in generating the pilot signal or information about a root sequence used in generating the pilot signal.

Optionally, the first message is further configured to schedule data transmitted between the first device and the communication device.

Optionally, the first message is DCI signaling.

Optionally, the pilot signal is an SRS, a CSI-RS, a DMRS, a CRS or a BMRS.

Optionally, the communication device 600 may correspond to the second device in the method embodiment, may realize corresponding functions of the second device and will not be elaborated herein for simplicity.

Figure 8:
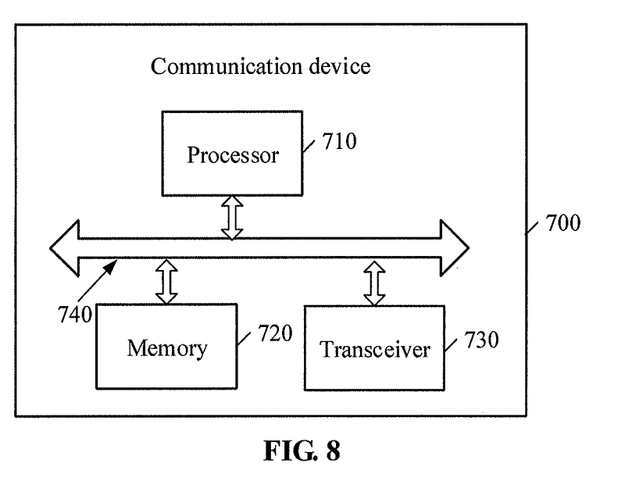
FIG. 8 illustrates a schematic block diagram of a communication device according to an embodiment of the application.

FIG. 8 illustrates a schematic block diagram of a communication device 700 according to an embodiment of the application. As illustrated in FIG. 8, the communication device 700 may include a processor 710, a memory 720 and a transceiver 730. Optionally, the communication device further includes a bus system 740, and the bus system is configured to interconnect the processor 710, the memory 720 and the transceiver 730. The memory 720 is configured to store an instruction. The processor 710 is configured to call the instruction stored in the memory 720 to execute corresponding operations.

Optionally, the processor 710 may call the instruction in the memory 720 to execute the following operations:

receiving, through the transceiver 730, a first message sent by a second device, the first message indicating the first device to receive or send a pilot signal and the first message including resource configuration information of the pilot signal; and through the transceiver 730, sending the pilot signal to the second device or receiving the pilot signal sent by the second device according to the resource configuration information.

Optionally, the processor 710 may call the instruction in the memory 720 to specifically execute the following operation:

sending the pilot signal to the second device or receiving the pilot signal sent by the second device in a time-domain resource unit transmitting the first message.

Optionally, the resource configuration information includes at least one of time-domain resource configuration information, frequency-domain resource configuration information or sequence configuration information of the pilot signal.

Optionally, the time-domain resource configuration information indicates at least one of timing information of the pilot signal or time-domain physical resource information adopted for transmission of the pilot signal.

Optionally, the timing information indicates a time-domain location of the pilot signal relative to the first message or a time-domain location of the pilot signal relative to data transmission scheduled by the first message.

Optionally, the time-domain physical resource information indicates at least one of an index of each of time-domain resource units adopted for transmission of the pilot signal in a predetermined time or a total number of the time-domain resource units.

Optionally, the frequency-domain resource configuration information indicates at least one of a transmission bandwidth of the pilot signal, a transmission density of the pilot signal, a frequency-domain starting location for transmission of the pilot signal or a subcarrier spacing adopted for transmission of the pilot signal.

Optionally, the sequence configuration information indicates at least one of information about a scrambling sequence used in generating the pilot signal or information about a root sequence used in generating the pilot signal.

Optionally, the first message is further configured to schedule data transmitted between the communication device 700 and the second device.

Optionally, the first message is DCI signaling.

Optionally, the pilot signal is an SRS, a CSI-RS, a DMRS, a CRS or a BMRS.

Optionally, the communication device 700 may correspond to the first device in the method embodiment, may realize corresponding functions of the first device and will not be elaborated herein for simplicity.

Figure 9:
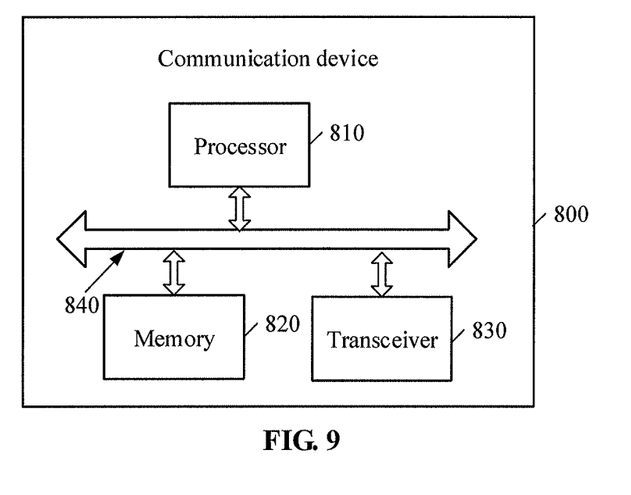
FIG. 9 illustrates a schematic block diagram of a communication device according to an embodiment of the application.

FIG. 9 illustrates a schematic block diagram of a communication device 800 according to an embodiment of the application. As illustrated in FIG. 9, the communication device 800 may include a processor 810, a memory 820 and a transceiver 830. Optionally, the communication device further includes a bus system 840, and the bus system is configured to interconnect the processor 810, the memory 820 and the transceiver 830. The memory 820 is configured to store an instruction, and the processor 810 is configured to call the instruction stored in the memory 820 to execute corresponding operations.

Optionally, the processor 810 may call the instruction in the memory 820 to execute the following operations:

sending, through the transceiver 830, a first message to a first device, the first message indicating the first device to receive or send a pilot signal and including resource configuration information of the pilot signal; and through the transceiver 830, sending the pilot signal to the first device or receiving the pilot signal sent by the first device according to the resource configuration information.

Optionally, the processor 810 may call the instruction in the memory 820 to specifically execute the following operation:

sending the pilot signal to the first device or receiving the pilot signal sent by the first device in a time-domain resource unit transmitting the first message.

Optionally, the resource configuration information includes at least one of time-domain resource configuration information, frequency-domain resource configuration information or sequence configuration information of the pilot signal.

Optionally, the time-domain resource configuration information indicates at least one of timing information of the pilot signal or time-domain physical resource information adopted for transmission of the pilot signal.

Optionally, the timing information indicates a time-domain location of the pilot signal relative to the first message or a time-domain location of the pilot signal relative to data transmission scheduled by the first message.

Optionally, the time-domain physical resource information indicates an index of each of time-domain resource units adopted for transmission of the pilot signal in a predetermined time or a total number of the time-domain resource units.

Optionally, the frequency-domain resource configuration information indicates at least one of a transmission bandwidth of the pilot signal, a transmission density of the pilot signal, a frequency-domain starting location for transmission of the pilot signal or a subcarrier spacing adopted for transmission of the pilot signal.

Optionally, the sequence configuration information indicates at least one of information about a scrambling sequence used in generating the pilot signal or information about a root sequence used in generating the pilot signal.

Optionally, the first message is further configured to schedule data transmitted between the first device and the communication device 800.

Optionally, the first message is DCI signaling.

Optionally, the pilot signal is an SRS, a CSI-RS, a DMRS, a CRS or a BMRS.

Optionally, the communication device 800 may correspond to the second device in the method embodiment, may realize corresponding functions of the second device and will not be elaborated herein for simplicity.

Those of ordinary skill in the art may realize that the units and algorithm steps of each example described in combination with the embodiments disclosed in the invention may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for transmission of a Channel State Information Reference Signal (CSI-RS), comprising:
   receiving, by a first device, a Downlink Control Information (DCI) signaling sent by a second device; wherein the DCI signaling indicates to the first device to receive the CSI-RS, the DCI signaling comprises resource configuration information of the CSI-RS, and is further configured to schedule data transmitted from the first device to the second device; wherein the resource configuration information comprises time-domain resource configuration information, frequency-domain resource configuration information and sequence configuration information of the CSI-RS, the time-domain resource configuration information indicates timing information of the CSI-RS and time-domain physical resource information adopted for transmission of the CSI-RS, the sequence configuration information indicates information about a root sequence used in generating the CSI-RS, and the time-domain physical resource information indicates a total number of time-domain resource units adopted for transmission of the CSI-RS in a predetermined time;
   receiving, by the first device, the CSI-RS sent by the second device according to the resource configuration information comprised in the DCI signaling; and
   transmitting, by the first device, Channel State Information (CSI) triggered by the CSI-RS.

2. The method of claim 1, wherein receiving, by the first device, the CSI-RS sent by the second device comprises:
   receiving the CSI-RS sent by the second device in a time-domain resource unit transmitting the DCI signaling.

3. The method of claim 1, wherein the timing information indicates a time-domain location of the CSI-RS relative to the DCI signaling or a time-domain location of the CSI-RS relative to data transmission scheduled by the DCI signaling.

4. The method of claim 1, wherein the time-domain physical resource information further indicates an index of each of time-domain resource units adopted for transmission of the CSI-RS in a predetermined time.

5. The method of claim 1, wherein the frequency-domain resource configuration information indicates at least one of a transmission bandwidth of the CSI-RS, a transmission density of the CSI-RS, a frequency-domain starting location for transmission of the CSI-RS or a subcarrier spacing adopted for transmission of the CSI-RS.

6. The method of claim 1, wherein the sequence configuration information further indicates information about a scrambling sequence used in generating the CSI RS.

7. The method of claim 1, wherein the first device is a terminal device and the second device is a network device.

8. A method for transmission of a Channel State Information Reference Signal (CSI-RS), comprising:
   sending, by a second device, a Downlink Control Information (DCI) signaling to a first device; wherein the DCI signaling indicates to the first device to receive the CSI-RS, the DCI signaling comprises resource configuration information of the CSI-RS, and is further configured to schedule data transmitted from the first device to the second device; wherein the resource configuration information comprises time-domain resource configuration information, frequency-domain resource configuration information and sequence configuration information of the CSI-RS, the time-domain resource configuration information indicates timing information of the CSI-RS and time-domain physical resource information adopted for transmission of the CSI-RS, the sequence configuration information indicates information about a root sequence used in generating the CSI-RS, and the time-domain physical resource information indicates a total number of time-domain resource units adopted for transmission of the CSI-RS in a predetermined time;
   sending, by the second device, the CSI-RS to the first device according to the resource configuration information comprised in the DCI signaling; and
   receiving, by the second device, Channel State Information (CSI) triggered by the CSI-RS.

9. A communication device, comprising:
   a first transceiver, configured to receive a Downlink Control Information (DCI) signaling sent by a second device; wherein the DCI signaling indicates to the communication device to receive a Channel State Information Reference Signal (CSI-RS), the DCI signaling comprises resource configuration information of the CSI-RS, and is further configured to schedule data transmitted from the communication device to the second device; wherein the resource configuration information comprises time-domain resource configuration information, frequency-domain resource configuration information and sequence configuration information of the CSI-RS, the time-domain resource configuration information indicates timing information of the CSI-RS and time-domain physical resource information adopted for transmission of the CSI-RS, the sequence configuration information indicates information about a root sequence used in generating the CSI-RS, and the time-domain physical resource information indicates a total number of time-domain resource units adopted for transmission of the CSI-RS in a predetermined time; and a second transceiver, configured to:
  receive the CSI-RS sent by the second device according to the resource configuration information comprised in the DCI signaling, and
  transmit Channel State Information (cSI) triggered by the CSI-RS.

10. The communication device of claim 9, wherein the second transceiver is specifically configured to:
  receive the CSI-RS sent by the second device in a time-domain resource unit transmitting the DCI signaling.

11. The communication device of claim 9, wherein the timing information indicates a time-domain location of the CSI-RS relative to the DCI signaling or a time-domain location of the CSI-RS relative to data transmission scheduled by the DCI signaling.

12. The communication device of claim 9, wherein the time-domain physical resource information further indicates an index of each of time-domain resource units adopted for transmission of the CSI-RS in a predetermined time.

13. The communication device of claim 9, wherein the frequency-domain resource configuration information indicates at least one of a transmission bandwidth of the CSI-RS, a transmission density of the CSI-RS, a frequency-domain starting location for transmission of the CSI-RS or a subcarrier spacing adopted for transmission of the CSI-RS.

* * * * *